(12) United States Patent
McCutcheon et al.

(10) Patent No.: US 10,605,312 B2
(45) Date of Patent: Mar. 31, 2020

(54) TWIN PLATE SEPARATION SYSTEMS

(71) Applicant: Eaton Corporation, Cleveland, OH (US)

(72) Inventors: Steven Eric McCutcheon, Ft. Wayne, IN (US); Troy Scott Reinoehl, Pine, CO (US); Derek Nicholas Rode, Fort Wayne, IN (US)

(73) Assignee: Eaton Intelligent Power Limited, Dublin (IE)

( * ) Notice: Subject to any disclaimer, the term of this patent is extended or adjusted under 35 U.S.C. 154(b) by 309 days.

(21) Appl. No.: 15/365,634

(22) Filed: Nov. 30, 2016

(65) Prior Publication Data

US 2017/0152897 A1 Jun. 1, 2017

Related U.S. Application Data

(60) Provisional application No. 62/260,709, filed on Nov. 30, 2015.

(51) Int. Cl.
| | | |
|---|---|---|
| *F16D 13/69* | (2006.01) | |
| *F16D 13/71* | (2006.01) | |
| *F16D 13/70* | (2006.01) | |
| *F16D 13/50* | (2006.01) | |

(52) U.S. Cl.
CPC ............. *F16D 13/69* (2013.01); *F16D 13/50* (2013.01); *F16D 13/70* (2013.01); *F16D 13/71* (2013.01); *F16D 13/505* (2013.01); *F16D 2013/706* (2013.01)

(58) Field of Classification Search
CPC .......... F16D 13/69; F16D 13/70; F16D 13/50; F16D 13/71; F16D 2013/706; F16D 13/505

See application file for complete search history.

(56) References Cited

U.S. PATENT DOCUMENTS

| | | |
|---|---|---|
| 4,207,972 A | 6/1980 | Zeidler |
| 4,339,023 A | 7/1982 | Maycock |
| 5,595,275 A | 1/1997 | Gochenour et al. |
| 5,957,259 A | 9/1999 | Teramae |
| 6,070,708 A | 6/2000 | Fukuda et al. |
| 6,409,002 B1 | 6/2002 | Orlamunder et al. |
| 6,457,572 B1 | 10/2002 | Dau et al. |

(Continued)

FOREIGN PATENT DOCUMENTS

WO   WO-2015117607 A1 * 8/2015 ............. F16D 13/70

*Primary Examiner* — Jacob S. Scott
*Assistant Examiner* — Lillian T Nguyen
(74) *Attorney, Agent, or Firm* — Mei & Mark, LLP

(57) ABSTRACT

A twin plate separation system, comprising a pressure plate, an intermediate plate facing the pressure plate, and a spring separator assembly. The spring separator assembly comprises a mounting extending out from the intermediate plate towards the pressure plate. A spring surrounds the mounting, and the spring is biased to push the pressure plate and the intermediate plate apart. The mounting or another fixture can secure at least one drive strap to the intermediate plate. Alternatively, the mounting extends out of the pressure plate towards the intermediate plate, and the spring surrounds the mounting and is biased to push the pressure plate and the intermediate plate apart. In this alternative, the intermediate plate does not comprise a hole for receiving the mounting.

20 Claims, 13 Drawing Sheets

(56) References Cited

U.S. PATENT DOCUMENTS

| | | | |
|---|---|---|---|
| 6,866,132 B2 * | 3/2005 | Gochenour | F16D 13/385 |
| | | | 192/70.18 |
| 6,886,674 B2 | 5/2005 | Szadkowski et al. | |
| 8,146,726 B2 | 4/2012 | McCutcheon et al. | |
| 8,459,427 B2 | 6/2013 | McCutcheon et al. | |
| 8,500,591 B2 | 8/2013 | Turner et al. | |
| 2003/0066729 A1 | 4/2003 | Feldhaus et al. | |
| 2003/0234149 A1 * | 12/2003 | Peterseim | F16D 13/68 |
| | | | 192/70.14 |
| 2011/0036677 A1 | 2/2011 | Kriebernegg et al. | |

\* cited by examiner

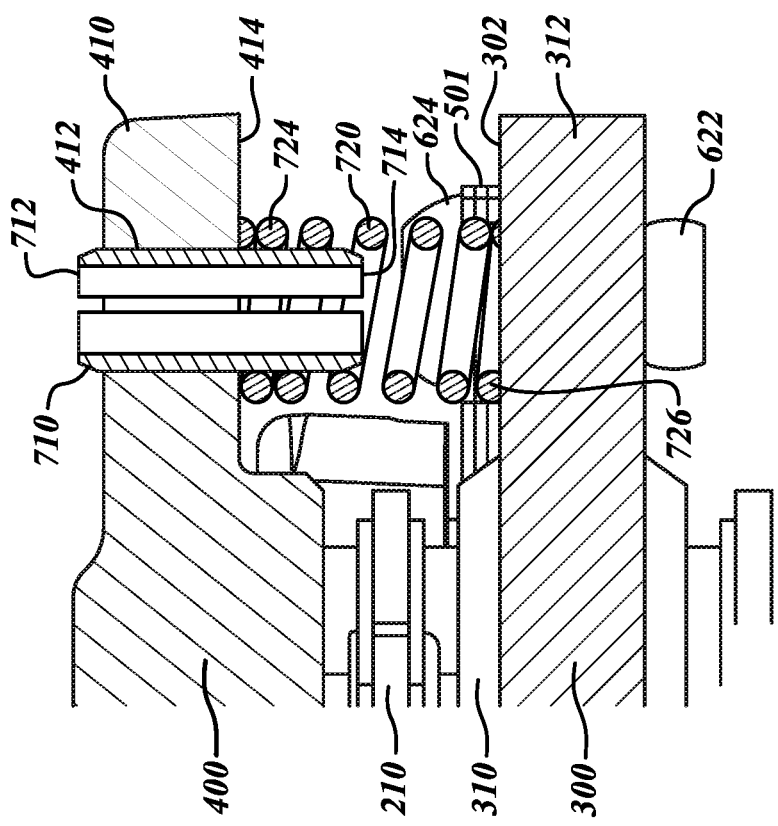

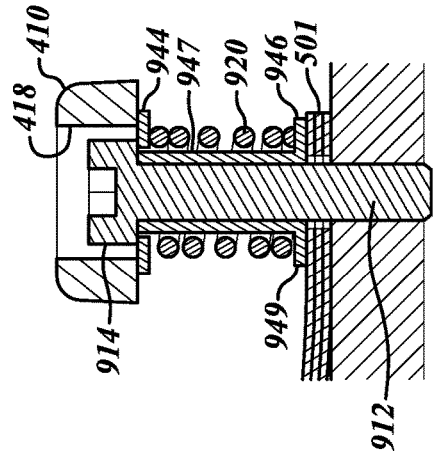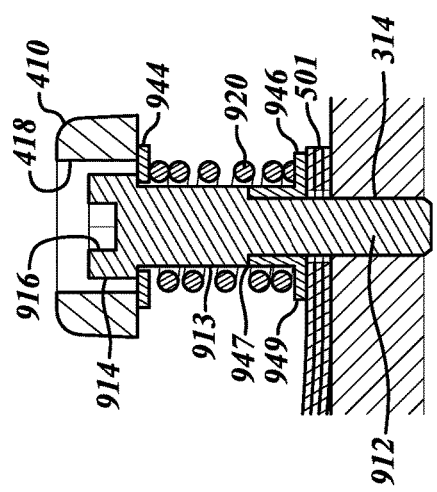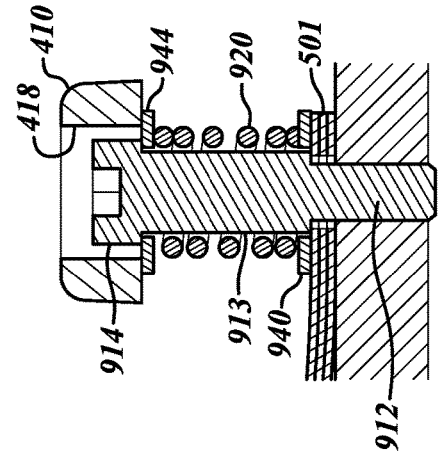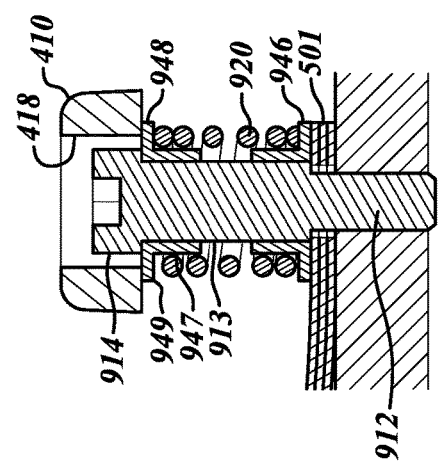

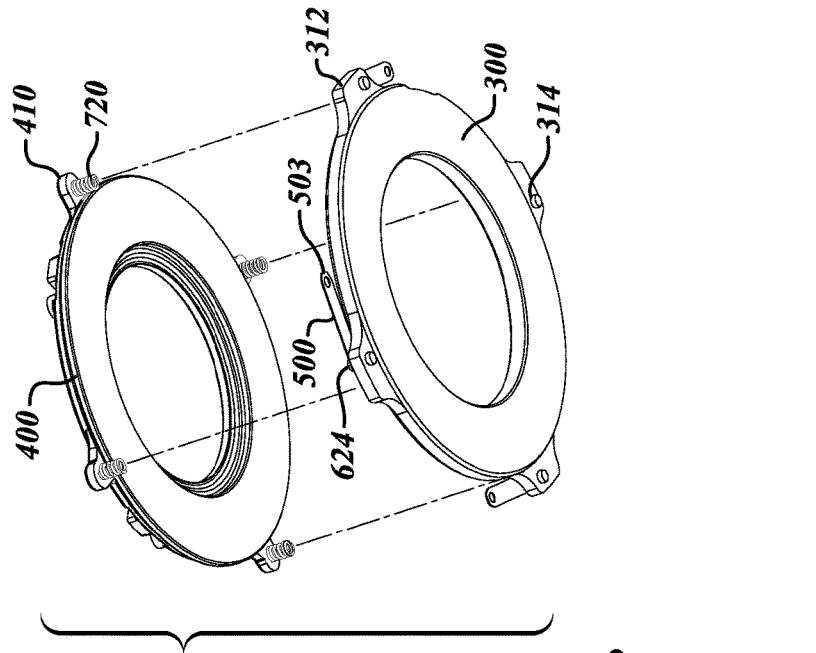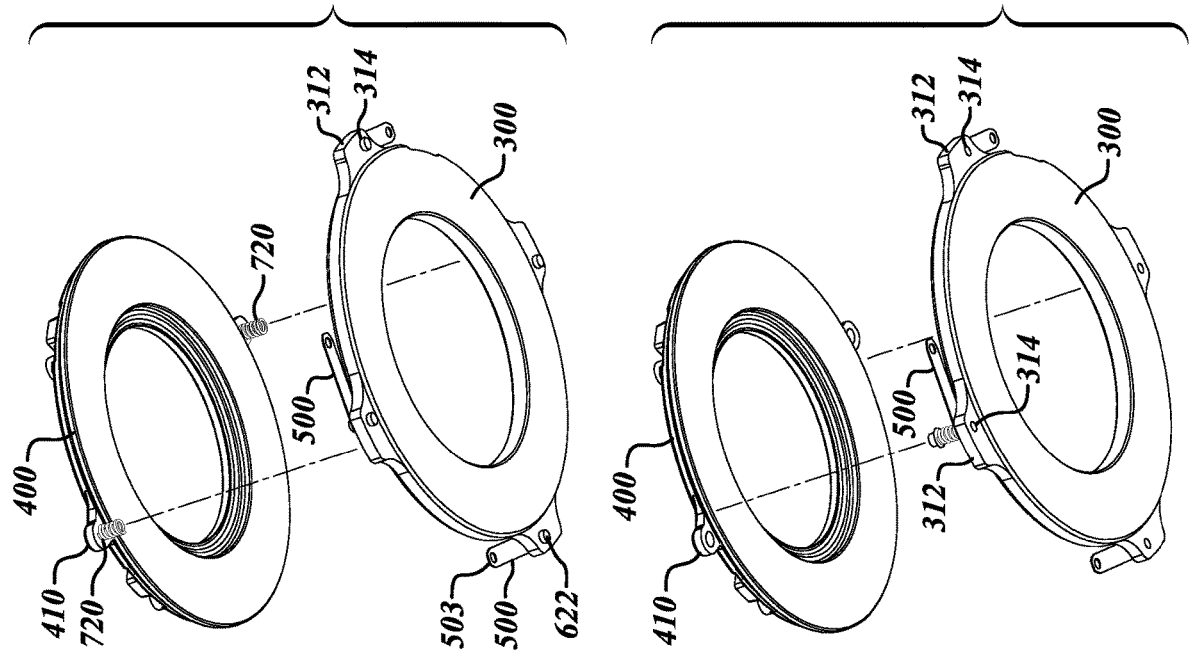

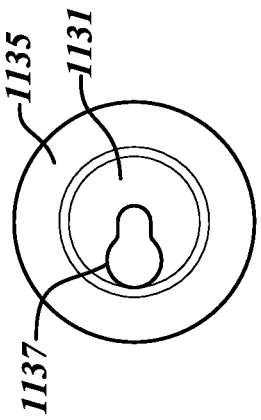
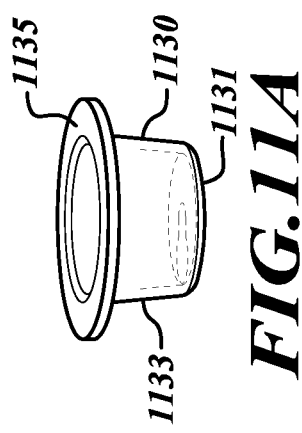
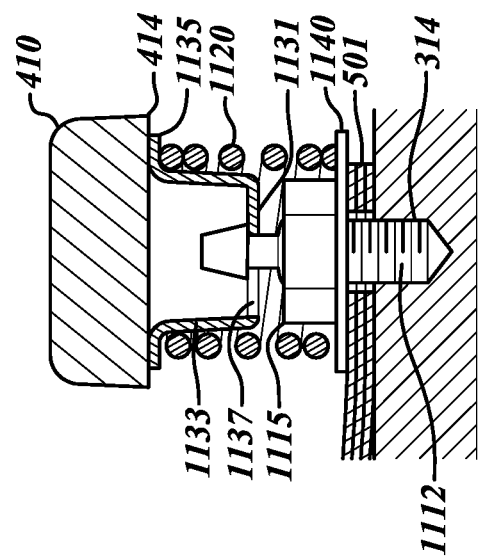
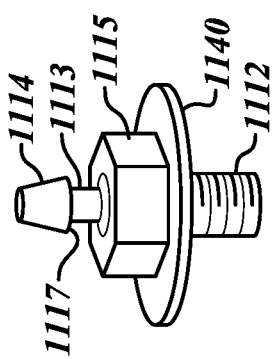

TWIN PLATE SEPARATION SYSTEMS

FIELD

This application relates to clutches having two plates and separation techniques for the two plates.

BACKGROUND

A flywheel outputs torque from an engine. A clutch can couple to the flywheel. Friction discs within the clutch engage to transmit torque, and decouple to discontinue torque transfer. The friction discs can couple with a coil spring to facilitate disc separation when the clutch is decoupled.

Prior techniques for the coil spring separator utilize a shoulder bolt, washer, and spring that are bolted into a pressure plate in four locations. Examples are shown in FIGS. 7 & 8. The intermediate plate has a clearance hole for the bolt head. The prior separation technique requires holes for affixing drive straps and additional holes to insert separation pins.

SUMMARY

The methods disclosed herein overcome the above disadvantages and improves the art by way of a twin plate separation system comprising a pressure plate, an intermediate plate facing the pressure plate, and a spring separator assembly. The spring separator assembly comprises a mounting extending out from the intermediate plate towards the pressure plate. A spring surrounds the mounting, and the spring is biased to push the pressure plate and the intermediate plate apart. The mounting secures at least one drive strap to the intermediate plate. Alternatively, the mounting extends out of the pressure plate towards the intermediate plate, and the spring surrounds the mounting and is biased to push the pressure plate and the intermediate plate apart. In this alternative, the intermediate plate does not comprise a hole for receiving the mounting.

A twin plate separation system alternatively comprises a pressure plate, an intermediate plate facing the pressure plate, and a spring separator assembly. A pin extends out of the pressure plate towards the intermediate plate. A spring surrounds the pin and is biased to push the pressure plate and the intermediate plate apart. The intermediate plate does not comprise a hole for receiving the pin.

A twin plate separation system alternatively comprises a pressure plate, an intermediate plate facing the pressure plate, and a spring separator assembly. The spring separator assembly comprises a bolt comprising a head, the bolt extending head first out of the pressure plate towards the intermediate plate. A spring surrounds the bolt and is biased to push the pressure plate and the intermediate plate apart. The intermediate plate does not comprise a hole for receiving the head of the bolt.

A twin plate separation system alternatively comprises a pressure plate and an intermediate plate facing the pressure plate, the intermediate plate comprising a mounting hole. At least one drive strap spans between the intermediate plate and the pressure plate. A spring separator assembly comprises a bolt comprising a head, the bolt extending head first out of the intermediate plate towards the pressure plate. A spring surrounds the bolt, the spring biased to push the pressure plate and the intermediate plate apart. The bolt secures an end of the at least one drive strap to the intermediate plate.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

BRIEF DESCRIPTION OF THE DRAWINGS

FIG. 5 is a cross-section view along line 5-5 of FIG. 2.
FIGS. 9A-9H are views of alternative spring separator assemblies, pressure plates, intermediate plates, and drive straps.
FIGS. 10A-10C are alternative views of pressure plates and intermediate plates.
FIGS. 11A-11D are views of an alternative spring separator assembly.

DETAILED DESCRIPTION

Figure 1:
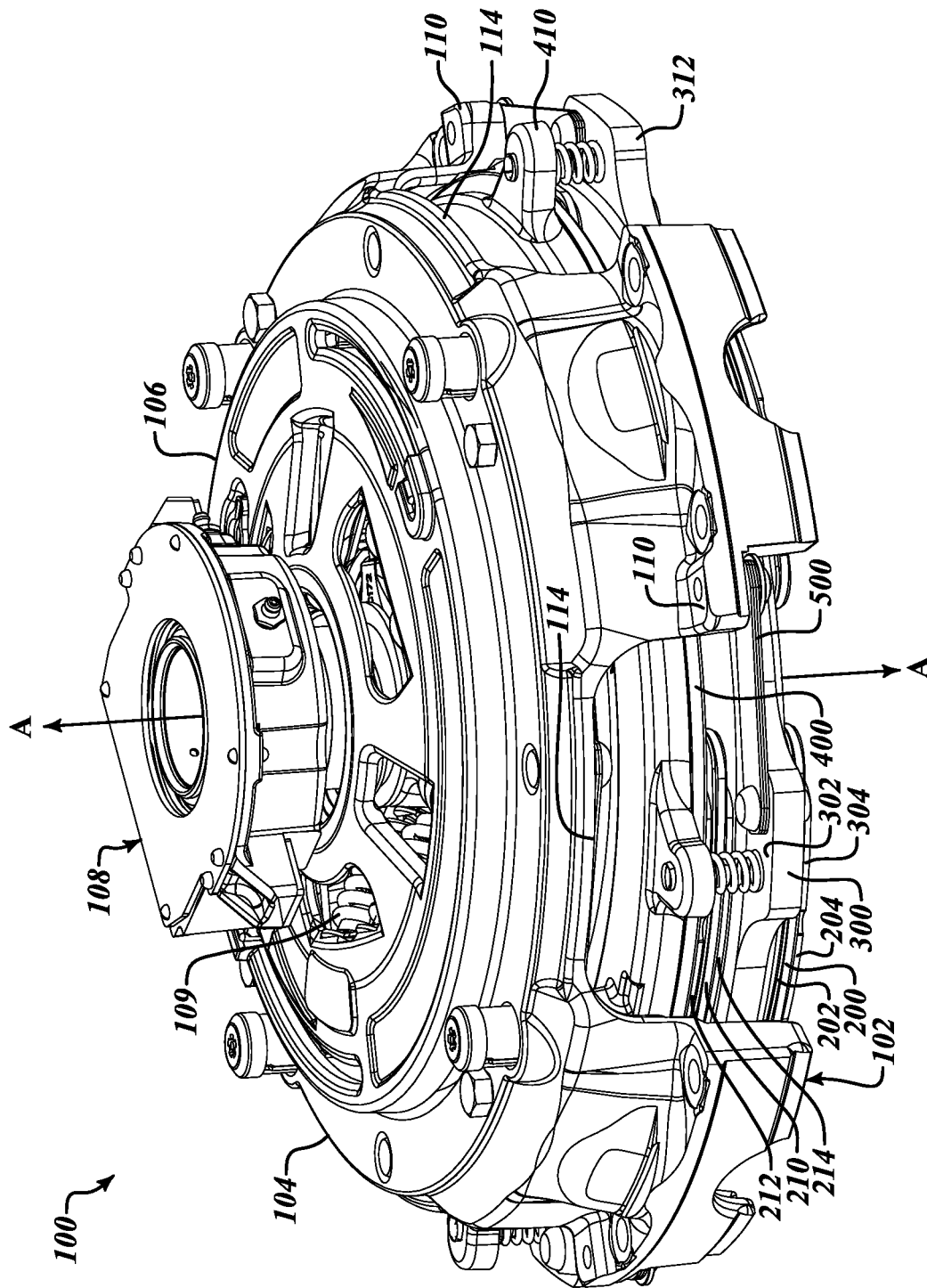
FIG. 1 is a perspective view of a clutch assembly.

Reference will now be made in detail to the examples which are illustrated in the accompanying drawings. Wherever possible, the same reference numbers will be used throughout the drawings to refer to the same or like parts. Directional references such as "upper," "lower," "left" and "right" are for ease of reference to the figures. The directional references are not meant to limit the orientation of the disclosed systems during use.

Clutch systems, such as clutch assembly 100, can be used to transfer torque from an engine to a transmission or other driveline component. A bottom 102 of a clutch cover 104 can be coupled to a flywheel of an engine to rotate. A top 106 of the clutch cover 104 can be oriented towards the transmission, and can connect to mechanisms, such as a release bearing assembly 108 or like device, to engage and disengage the clutch components. The clutch can be a push or pull type, and can comprise other actuators, such as a catapult linkage, a concentric actuator, an electric actuator, mechanical rod, hydraulic system, or the like. The clutch can be adjustable or wear through, and can comprise a variety of clutch friction discs. The discs can vary in spline size, facing type, number of facings, cushion rate, damper rate, facing (friction) material and can optionally comprise pre-damper mechanisms, among other variables. A center axis A can be surrounded by an input shaft for coupling to the transmission. A central hub and other customary clutch components can be arranged for torque transfer and to couple to the clutch friction discs and damper mechanisms.

A first friction disc 200 can comprise a friction material 204 configured to engage with the flywheel when the clutch is engaged. A rear friction material 202 is configured to grip a first side 304 of the intermediate plate 300. A second friction disc 210 is configured to grip an inner surface 310 on a second side 302 of the intermediate plate 300. A rear side friction material 212 of the second friction disc 210 is configured to grip a pressure plate 400. The pressure plate 400 is actuated by any one of a number of actuators. The pressure plate can move towards the bottom 102 of the cover 104 to compress the first friction disc 200, intermediate plate 300, and second friction disc 210 together and towards the flywheel. When compressed, torque is transferred from the flywheel to a central hub, and from the central hub to the transmission or other driveline component. The example in FIG. 1 shows pressure springs 109. Other mechanisms such as cams, adjusting rings, lever springs, etc. are included in the clutch assembly 100 based on application.

Twin-plate clutches incorporate an intermediate plate 300 located between the two driven disc assemblies (first friction disc 200 and second friction disc 210). Intermediate plate 300 can transfer torque through drive straps 500. A single drive strap or a stack of drive straps can be used. To minimize drag when the clutch is open and to ensure equal wear of facings on the driven disc assemblies, spring separator assemblies, such as shown in FIGS. 2-6 and 9A-12B, are placed between the pressure plate 400 and intermediate plate. It is desirable to separate friction discs 200 & 210 in a clutch assembly 100. Applying spring separators to an intermediate plate 300 and a pressure plate 400 of the clutch assembly can enhance friction disc 200, 210 separation for even wear of the friction material on the friction discs.

It is desired to minimize or eliminate holes in the intermediate plate 300 or pressure plate 400 of the clutch assembly. It is further desired to consolidate assembly operations by mounting the drive straps 500 of the clutch assembly using the spring separators. It is further desired to simplify assembly of the overall clutch package, including connecting the drive straps 500 to the clutch cover 104.

The plate separation techniques disclosed herein allow for easier assembly, a more robust intermediate plate design, and a more cost effective method for utilizing a coil spring as an intermediate plate separation system. The design shown in FIGS. 2-5 replaces the shoulder bolt and washer of prior art FIGS. 7 & 8 with a pin that is pressed into the pressure plate. The purpose of the pin is to retain the coil spring during rotation of the assembly. The spring can be seated against machined surfaces on both the pressure plate and the intermediate plate. The combination permits the spring to react against departures in the plate orientations. The overall departure forces can be split evenly between the pressure plate and the intermediate plate. The friction discs can be evenly separated from engagement so that the friction material wears more evenly.

The design also allows for the intermediate plate to be installed on the spring and then rotated such that the intermediate plate can be bolted to the flywheel ring from the transmission side of the clutch. This provides assembly benefits. The new design eliminates the need to drill a clearance hole for the bolt head, which reduces tolerance stack-up and labor.

The clutch assembly 100 of FIG. 1 is configured to have four twin plate separation systems, as also illustrated in FIG. 10C. Other numbers of separation systems can be used, such as illustrated in FIG. 10B. More or fewer can be used, based on the application for reasons such as torque throughput, vibrations, etc.

Figure 2:
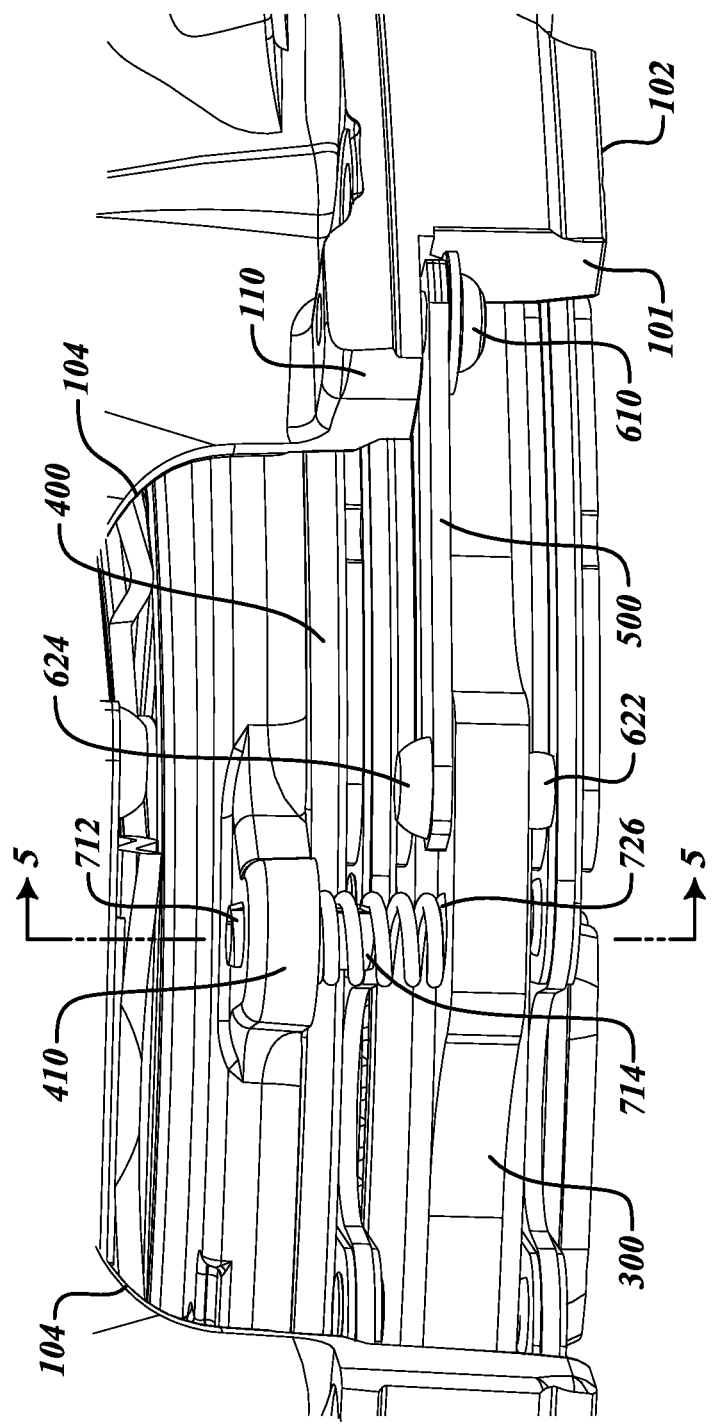
FIG. 2 is a side section view of a clutch assembly.

FIG. 2 shows a close-up of one of the twin plate separation systems shown in FIG. 1. Pressure plate 400 is configured to move along axis A between an engaged position and a disengaged position. In the engaged position, pressure surface 401 is gripped by friction material 212 of friction disc 210. Friction material 212 can be mounted to friction disc 210 via a backer plate 222.

An intermediate plate 300 faces the pressure plate 400. In the engaged position, second friction material 214 grips the inner surface 310 of intermediate plate 300. Second friction material 214 can be mounted to friction disc 210 via a backer plate 224.

In the engaged position, another friction disc 200 can grip the flywheel, and torque can be transferred from the flywheel, through the clutch, to a shaft coupled to a central hub. Customary techniques can be used for mounting the friction discs to an inner shaft, with or without damper or pre-damper assemblies, or with or without cushion assemblies. A friction disc comprising between 2 and 6 "pucks" or "paddles" of friction material per side can be used, or full-facing clutch materials can be used. Ceramic or organic materials can be used for the friction material 212, 214, 202, 204. One example of a clutch with an actuation mechanism, central hubs and friction discs is U.S. Pat. No. 8,146,726, assigned to the assignee of the present application, and incorporated herein by reference in its entirety.

Unlike U.S. Pat. No. 8,146,726, a spring separator assembly herein comprises a mounting, which can comprise split pin, coil pin, spring pin, slotted spring pin, or a roll pin pin 710, or the like, extending out of a hole 412 in an outer boss 410 on pressure plate 400. As shown in FIG. 5, the mounting comprises a head end 712, which can be embedded within the boss 410 or which can protrude out of the hole 412 on an upper side of the pressure plate 400. The mounting extends towards the intermediate plate second side 302. A boss 312 can be included on the intermediate plate for abutting the spring separator assembly and for coupling to drive strap 500. Boss 410 and boss 312 can be protrusions from the respective circumferences of the respective pressure plate and intermediate plate. In the alternative, boss 410 and boss 312 can be circumferentially integral, and not project. A second end 714 of the mounting does not fix to the intermediate plate 300. The intermediate plate 300 does not comprise a hole for receiving the mounting 710. The second end 714 can be configured not to touch, and not to be mounted to, the intermediate plate 300.

A spring 720 spans between the pressure plate lower side 414 and the intermediate plate second side 302. The lower side 414 of the pressure plate can comprise one or more machined surfaces for locating the spring. And, the intermediate plate can comprise one or more machined surfaces for locating the spring. Spring 720 can be a coil spring comprising a length and a diameter that varies along the length. The diameter can be smaller at a mounting end 724 adjacent the mounting for gripping the mounting. The mounting end 724 can have a smaller diameter than a second end 726 of the spring. The second end 726 of the spring can be received in a machined surface in second side 302 of intermediate plate 300. The machined surface can comprise a pocket, groove or rim, and the machined surface does not pass through the intermediate plate 300 or through the pressure plate, when used. Spring 720 surrounds the mounting 710 and is biased to push the pressure plate 400 and the intermediate plate 300 apart. The bias of the spring facilitates the disengagement of the clutch assembly 100 by spacing the pressure plate 400 and the intermediate plate from the friction disc 210.

Figure 6:
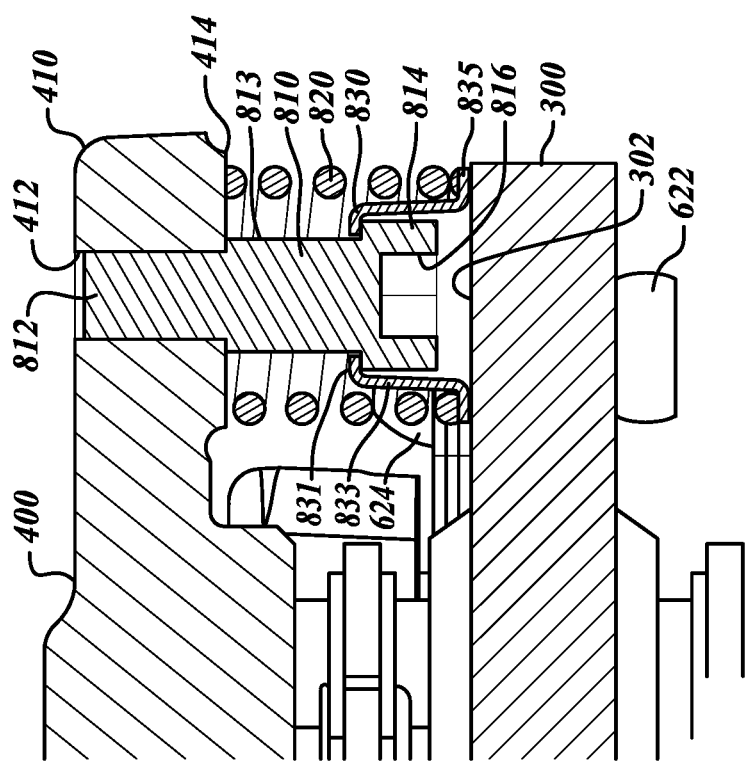
FIG. 6 is an alternative cross-section view of a spring separator, a pressure plate, and an intermediate plate.

Turning to FIG. 6, an alternative mounting is shown. Mounting is a bolt 810 comprising a head 814, a neck 813, and body 812. Diameter changes can comprise a neck-down at the neck 813 and another neck-down at the body 812. The head 814 can comprise a coupling feature 816 for manipulating the bolt, such as a hex, Phillips or flat-head recess or exterior hex or other shape for interfacing with an assembly tool. Bolt 810 extends head-first out of the hole 412 of the boss 410 of the pressure plate 400 towards the intermediate plate 300. Hole 412 and body 812 can be threaded to couple, or can be sized to press-fit or interference-fit.

A hat-like cap 830 can be fitted to the head 814 of the bolt 810. Cap 830 comprises a brimmed portion 835 in contact with the intermediate plate 300. Cap 830 comprises a flue portion 833 between the brimmed portion 835 and a top portion 831. The bolt head 814 abuts the top portion 831. The top portion 831 can comprise an opening sized to permit the neck 813 to pass through the cap 830, yet sized to catch against the head 814 and retain the cap 830. When the clutch engages and disengages, the pressure plate 400 moves with respect to the intermediate plate 300, and so the top 831 of the cap 830 can reciprocate along the neck 813 of the mounting 810. The opening in top 831 can be a fingered TINNERMAN style, keyed, or circular. A spring 820 surrounds the flue portion 833. The spring 820 is biased to push the intermediate plate 300 and the pressure plate 400 apart. The spring can be biased against the brim 635 of the cap, and the diameter of the spring 820 can be chosen to grip the cap 830. Bolt 810 comprises a neck portion 813 between the head 814 and the pressure plate 400. Neck-down portion of body 812 is embedded in the pressure plate 400. Head is not embedded in the intermediate plate. Pressure plate 400 can move towards and away from intermediate plate to engage and disengage the clutch assembly 100.

Figure 7:
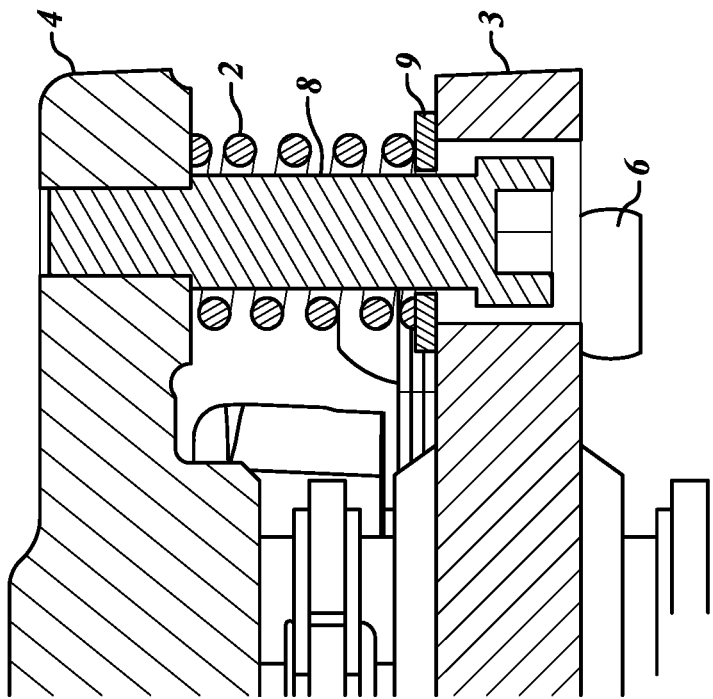
FIG. 7 is a view of a prior art spring separator, pressure plate, and intermediate plate.
Figure 8:
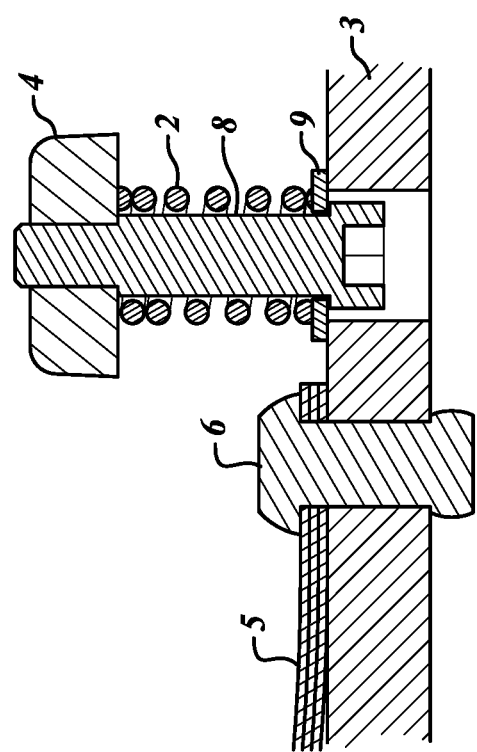
FIG. 8 is a view of a prior art spring separator, pressure plate, intermediate plate, drive strap, and drive strap rivet.

Comparing to prior art FIGS. 7 & 8, the bolt 8 requires clearance holes in both a pressure plate 4 and an intermediate plate 3. A washer 9 is present to abut spring 2. A rivet 6 mounts drive straps 5 to intermediate plate 3. The prior art arrangement requires additional machining and tooling to form the hole in the intermediate plate. Tolerance stack-ups become an issue. Eliminating the hole in the intermediate plate 3, as disclosed herein, reduces tolerance issues. An additional benefit inures via the present disclosure as to mounting the drive straps disclosed herein, as compared to prior art drive strap 5 mounting arrangements.

The alternative shown in FIG. 6 avoids drilling a clearance hole for a bolt head in the intermediate plate 300. There is clearance between the head of the bolt and the intermediate plate to allow for a degree of play between the intermediate plate 300 and pressure plate 400.

Figure 3:
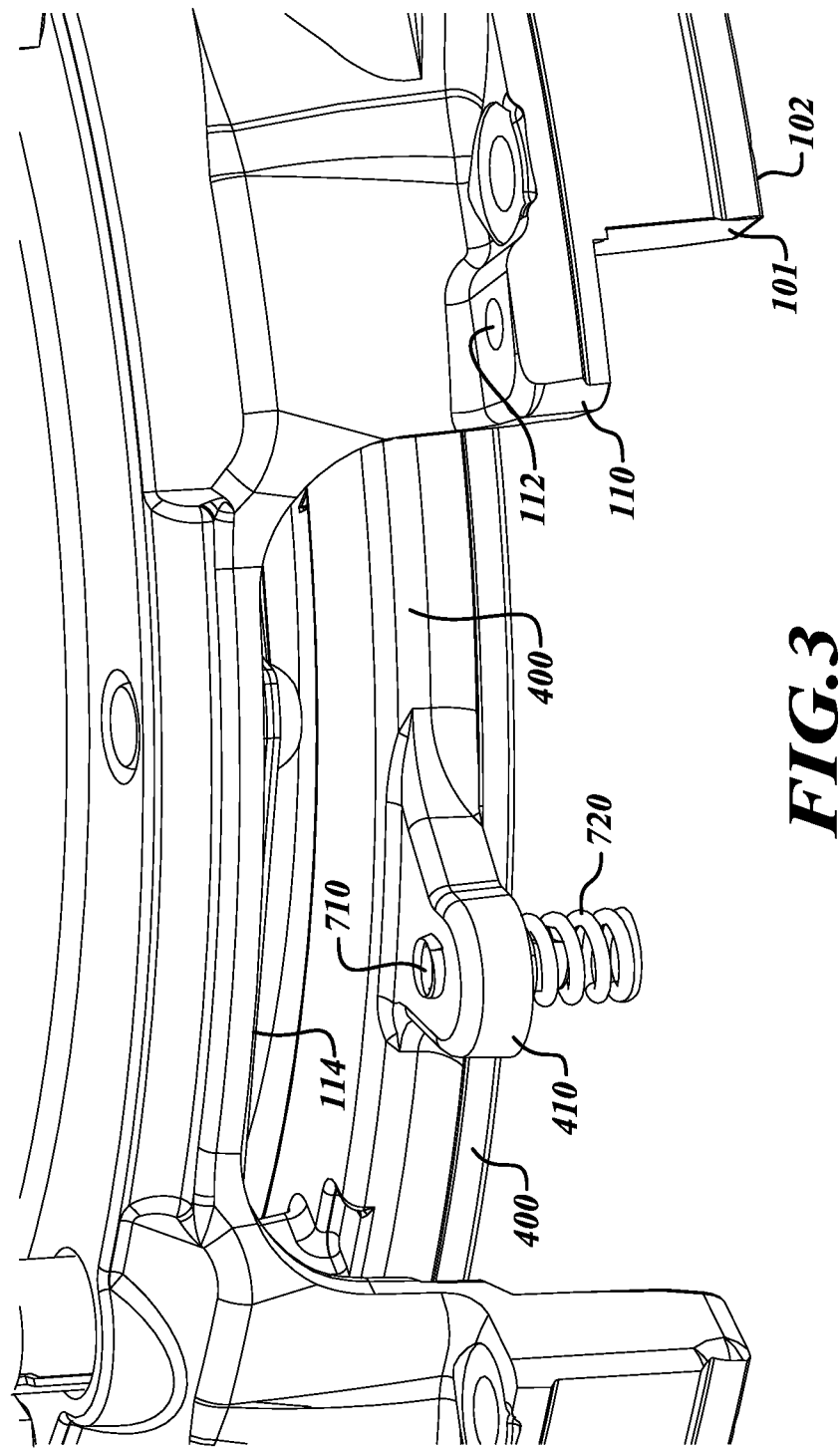
FIG. 3 is a view of the clutch assembly and pressure plate with a spring separator.
Figure 4A:
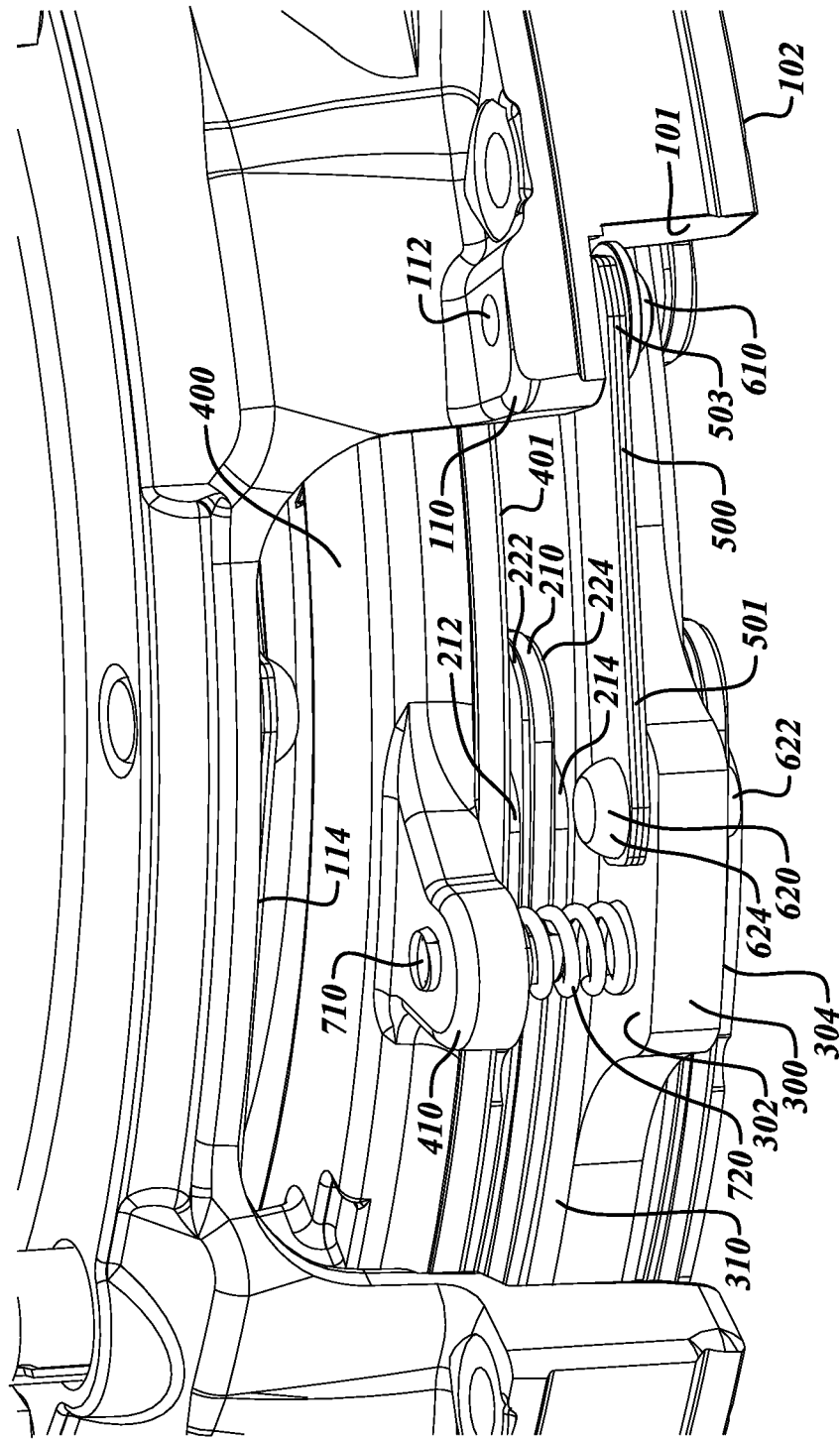
FIGS. 4A & 4B are alternatives of a clutch assembly with a spring separator spanning between a pressure plate and an intermediate plate.

Cover 104 houses the pressure plate 400 and the intermediate plate 300. A bottom 102 of a clutch cover 104 can be coupled to a flywheel of an engine to rotate. A top 106 of the clutch cover 104 can be oriented towards the transmission and can connect to mechanisms, such as a release bearing assembly 108 or like device. Ease of assembly and reduced tolerance stack-up are desired. In the embodiment of FIG. 4A, it is possible to assemble the clutch by dropping in a portion of the mechanisms that actuate the pressure plate, such as leaf springs, positioning springs, lever mountings, or the like. Similar to what is shown in FIG. 3, after fixing the mounting 710 to the pressure plate and securing the spring 720, it is possible to drop the pressure plate in to the cover 104. Next the friction disc 210 can be dropped in. After attaching end 501 of drive strap 500 to boss 312 on intermediate plate, it is possible to place intermediate plate in to cover 104. Drive strap fixture 610 can be used to mount end 503 of drive strap to boss 110.

Cover 104 comprises a strap-mounting hole 112. At least one drive strap 500 spans the intermediate plate 300 and the cover 104. A stack of drive straps, or a single drive strap can be used, depending on the application. The at least one drive strap 500 is fixed to the first strap-mounting hole 112 and to the intermediate plate 300. In FIG. 4A, the drive strap fixture 610, in this case a threaded screw, is fixed to the cover, securing the drive straps 500, in the direction of drop-in assembly. The drive strap fixture can comprise a head and a body, and it can be integrally formed with a rim or be paired with a washer. The strap-mounting hole 112 can be configured to receive the drive strap fixture 610 in a direction from the bottom 102 towards the top 106 of the cover. Boss 110 can be formed to project away from the bottom 102 of the cover to avoid interfering with coupling to the flywheel. A step 101 can be included to isolate the boss 110 from interfering with other parts and couplings. Boss 110 comprises the strap-mounting hole 112, and the strap-mounting hole 112 can be piloted through the boss, as drawn in FIGS. 1 & 4A, or it can be partially passed through the boss 110.

Figure 4B:
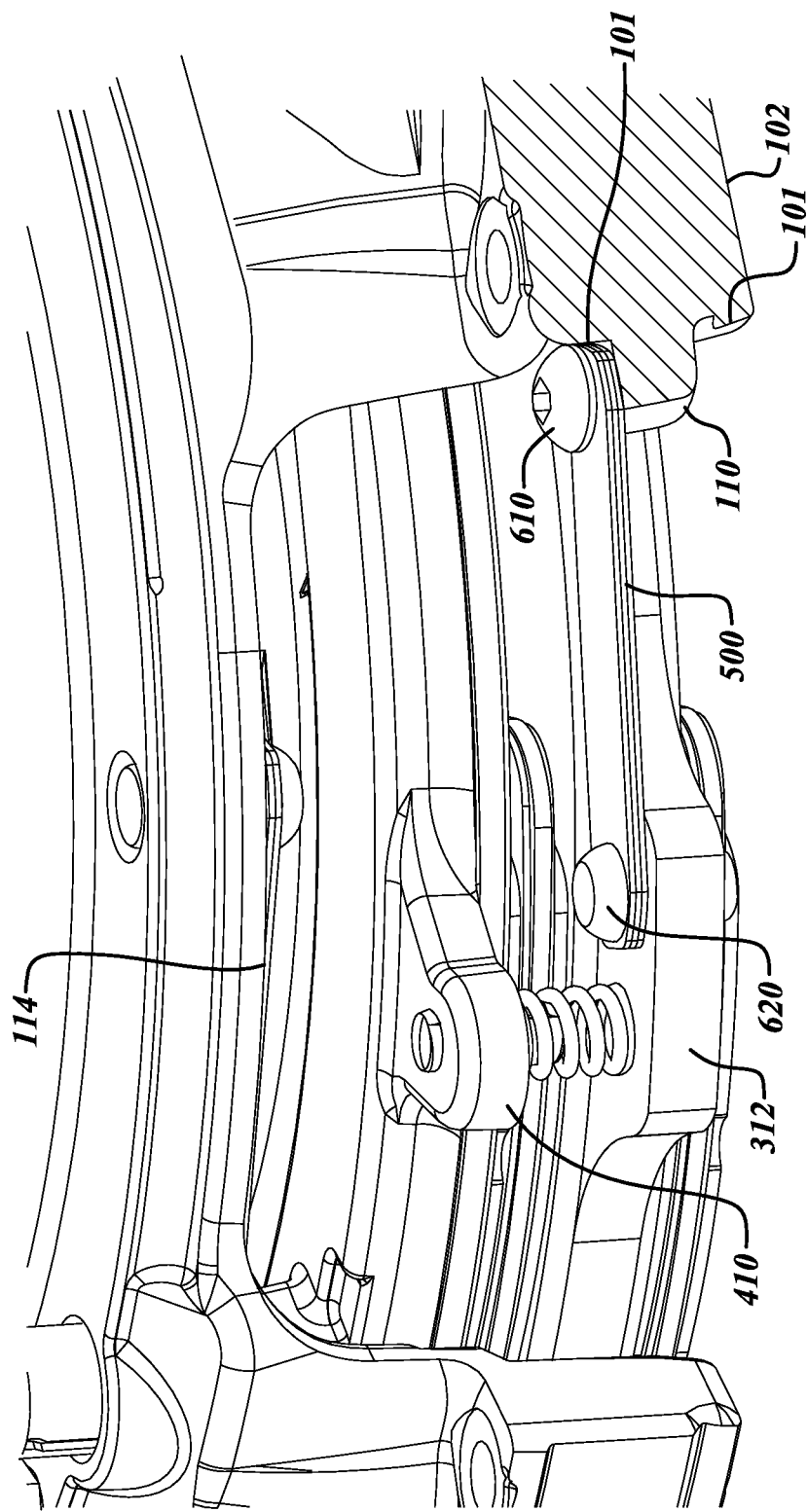

In FIG. 4B, the head of the drive strap fixture 610 extends upwards towards the top 106 of the cover. The strap-mounting hole 112 is configured to receive the drive strap fixture 610 in a direction from the top 106 of the cover towards the bottom 102 of the cover. The body of the drive strap fixture 610 extends downwards towards the bottom 102. The boss 110 is modified in its position to achieve proper alignment with the intermediate plate, so that the drive straps 500 are appropriately tensioned between the cover 104 and the intermediate plate 300. To this end, the boss 110 comprises two steps 110: a step-up from the bottom 102 of the cover and a step-out and a step-down from the top 106 of the cover.

Radial openings 114 in the cover are spaced around the axis A to accommodate the bosses 110, 410, and 312. The bosses 110, 410, and 312 can be sized and shaped to fit within radial openings and to optimize packaging space for the clutch by fitting within the outer profile of the clutch package, without requiring expansion of the covered space or enlargement of the footprint for the clutch assembly 100.

The prior art of FIG. 8 shows a pair of holes in the intermediate plate 3. One hole is for the mounting 8, and another hole is for the rivet 6. Two holes increases tolerance stack-up and two holes requires additional material for strength.

In the FIG. 4A, 4B, 10A & 10C embodiments, the boss 312 of intermediate plate 300 comprises a strap-mounting hole 314, through which a rivet 620 or like device, passes through. The boss does not comprise a hole for mounting 710 or 810. Less material is needed, but greater rigidity is achieved because the second side 302 is a biasing surface, but the boss 312 is not as perforated as the prior art. At least one drive strap 500 is fixed to the second strap-mounting hole 314. A head 624 of the rivet secures one side, and a bottom 622 of the rivet fixes to another side of the intermediate plate 300. Screws or bolts can be substituted for the rivet.

The first embodiments reduce the number of mounting holes on the pressure plate and intermediate plate from 3 holes down to 2 holes. The embodiments of FIGS. 9E-9H also achieve a hole reduction from 3 holes down to 2 holes over the prior art. The embodiments of FIGS. 9A-D & 11A-12B reduce the number of holes from 3 holes down to 1 hole. Manufacturability and durability are improved over the prior art, while reducing material use and clutch assembly footprint. Several aspects of the clutch assembly 100 remain the same, and apply equally to the remaining embodiments while not being repeated herein below.

FIGS. 9A-9D show alternative spring separator assemblies where a mounting is secured to the intermediate plate 300, and a spring is biased to push the intermediate plate 300 and pressure plate 400 apart without puncturing the pressure plate 400. Instead of riveting drive straps 500 to the intermediate plate 300 and mounting a separate spring separator assembly, as shown in FIG. 8, the concepts disclosed here reverse the orientation of the spring separator assembly and combine the spring separator assembly with the functionality of drive strap fixation to reduce part and assembly cost.

FIGS. 9A-9H use the mounting for the spring separator assembly to mount the drive straps 500. No separate hole is needed in the intermediate plate 300 for the spring separator assembly. Snap rings or washers can be used to seat the spring and can further distribute forces applied to the bolt. Alternatives include various sleeves to perform one or more of spring retaining, bolt locating, or drive strap securement. This eliminates an intermediate plate lug hole. The spring separator assembly further functions to secure the drive straps to the intermediate plate. This eliminates a processing step by removing a separate riveting step. It also reduces material use by eliminating the separate rivet.

In FIGS. 9A-9E & 11A-12B, a twin plate separation system for a clutch comprises a pressure plate 400 with a boss 410. The boss 410 can be sized to minimize material use and to project radially outward from the axis A. Intermediate plate 300 faces the pressure plate 400 and comprises a drive-strap mounting hole 314. At least one drive strap 500 has an end 501 mounted to the drive-strap mounting hole 314. Spring separator assembly comprises a mounting extending out from the intermediate plate 300 towards the pressure plate 400. A spring surrounds the mounting. The spring is biased to push the pressure plate and the intermediate plate apart. The mounting secures at least one drive strap 500 to the intermediate plate 300. As above, a first friction disc can be mounted between the pressure plate 400 and the intermediate plate 300 and a second friction disc can be mounted adjacent the intermediate plate to form a dual-disc clutch assembly.

As above, the boss 110 can be configured for mounting the drive-straps 500 so that the intermediate plate is rotationally joined to the cover 104 with the play afforded by the drive straps 500. The boss can be configured to receive a drive strap fixture in a direction from the top of the cover towards the bottom of the cover. A drive strap fixture comprises a head and a body, and the head extends upwards towards the top and the body extends downwards towards the bottom. Or, the strap-mounting hole can be configured to receive a drive strap fixture in a direction from the bottom towards the top. A head of the drive strap fixture extends downwards towards the bottom and the body extends upwards towards the top.

FIGS. 9A-9D comprise spring separator assemblies that eliminate the hole in the pressure plate 400. Mounting is a bolt 910 comprising a head 914, a neck 913, and body 912. Diameter changes can comprise a neck-down at the neck 913 and another neck-down at the body 912. The head 914 can comprise a coupling feature 916 for manipulating the bolt, such as a hex, Phillips or flat-head recess or exterior hex or other shape for interfacing with an assembly tool. A cap 930 assists with locating the spring 920, 922 and bolt 910 with respect to a boss 312 on the pressure plate 300. Snap rings and or washers 940, 942 can again be used to assist with spring 920, 922 location and drive strap 500 fixation. When snap rings are used, additional diameter changes can be included on the mounting to secure the location of the snap ring. For example, a groove can be included on the mounting. Various springs 920, 922, such as coil, Belleville, wave, and leaf springs can be used.

Bolt 910 can comprise a bolt or screw with a head 914. As shown, a bolt can extend head-first out of the intermediate plate 300 towards the pressure plate 400. The body 912 can press-fit in to intermediate plate 300, or a threaded coupling can occur between hole 314 and body 912. A boss 312 can radially project from intermediate plate 300, and can be the location for securing mounting and drive straps. Similar to the above, the head 914 does not contact the pressure plate 400, but can adjoin the cap 930. Pressure plate 400 does not comprises a hole for receiving the head 914 of bolt, but can be arranged to contact cap 930. A boss 410 can be included on pressure plate 400 to interface with spring separator assembly. The neck 913 can reciprocate through the hole in the top 931 of the cap 930, and the head 914 can catch against the opening to secure the cap 930 to the head 914. The pressure plate 400 can move towards and away from the intermediate plate, the mounting arrangement permits this motion and encourages separation during clutch disengagement.

The cap 930 can be hat-like, and can comprise a brim 935, a flue 933, and a top 931. Brim 935 is optional, but when included is in contact with the pressure plate 400. Boss 410 can be included to project radially outward from pressure plate 400 and to contact the cap 930, and boss can be sized and shaped relative to the cap 930 and can include recesses, grooves, a tapered lead angle 416, or other features to locate the cap 930. Flue 933 is between the brim 935 and a top portion.

Figure 9B:
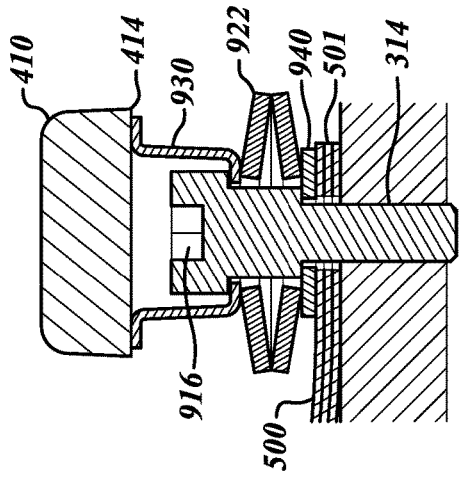
Figure 9A:
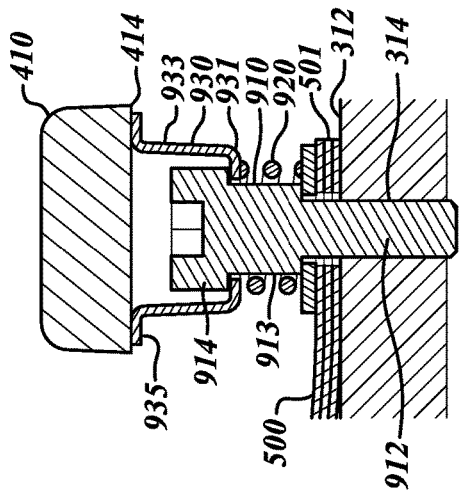
Figure 9D:
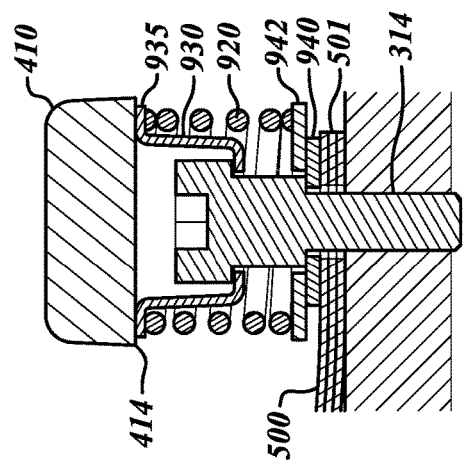
Figure 9C:
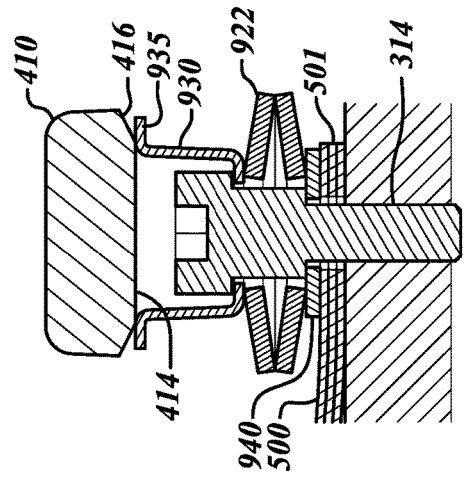

Spring is one of a coil spring 920, a Belleville washer 922, a leaf spring or the like. Spring is biased against a snap ring or washer 940 secured by a diameter change between neck 913 and body 912, and spring is biased towards the head 914. In FIG. 9A, spring 920 abuts the top portion and is sized to surround the neck 913. A washer 940 abuts the spring 920 and provides some clamp force to end 501 of drive straps 500. Washer 940 abuts the at least one drive strap on a first side and the spring on a second side. Body 912 passes through washer 940 and drive straps 500, and body 912 is secured in hole 314 of boss 312. A different spring, Bellville washer 922, is biased between washer 940 and top 931 of cap 930. FIG. 9C shows the alternative comprising a tapered lead angle 416. In FIG. 9D, another alternative shows that spring 920 surrounds flue portion 933 and spring 920 is biased against the brim 935. A stack is shown and can comprise one or both of snap rings or washers. The diameters of the stack members can be chosen to accommodate the circumference of the spring coil and to provide clamp force to the end 501 of drive straps 500. Spring can abut only one member of the stack, or spring can abut one or both members of the stack. Washer 940 and stack members can alternatively be one of washer, snap ring, or nut, and can be with or without threading and can alternatively seat in location grooves or other diameter changes in the mounting.

Turning to FIGS. 9E-9H, mounting is again illustrated as a bolt 910 comprising a head 914, a neck 913, and body 912, but in FIG. 9F, the bolt 910 comprises only head 914 and body 912. Diameter changes can comprise a neck-down at the neck 913 and another neck-down at the body 912. The head 914 can comprise a coupling feature 916 for manipulating the bolt, such as a hex, Phillips or flat-head recess or exterior hex or other shape for interfacing with an assembly tool. Threading can be included on the body 912 with complementary threading in hole 314. Mounting hole 418 is included through pressure plate 400, and can be located through boss 410. Mounting hole 314 is included in intermediate plate, and can be located in or through boss 312.

In FIGS. 9E, 9F & 9H, a washer 944 abuts pressure plate 400 near hole 418. Head 914 is received in hole 418, and washer 944 can abut head 914. Spring 920 is biased to push washer 944 against head 914 and or pressure plate 400. While these embodiments have greater tolerance stack-up, the hole 418 in pressure plate can have greater play, and washer 944 can be selected to accommodate that play.

Alternative to a washer 944, a snap ring can be used, or, as shown in FIGS. 9E-9G, one or more sleeved spring retainers 946, 948 can be coupled to the mounting. The sleeved spring retainers 946, 948 can cover threading on the neck 913 or body 912, and can be braced against the mounting. When having an "L" shape, the sleeved spring retainer 948 can be braced between head 914 and neck 913, between neck 913 and body 912, or between head 914 and body 912. The "L" shape can position the spring 920, and can apply clamp force by abutting end 501 of the at least one drive strap 500. The sleeve portion can facilitate smooth coiling of the spring 920, or can facilitate maintaining spring position. Spring 920 can surround the sleeved spring retainers 946, 948.

The bolt head can abut a sleeved spring retainer, as shown in FIG. 9F, and the sleeved spring retainer 946 can be sized so that the sleeve 947 of the retainer extends along the mounting to abut the head 914. A retainer portion 949 functions as a washer to abut the at least one drive strap 500. When the body 912 is secured in the hole 314 in the intermediate plate boss 312, the head applies pressure to the sleeve 947, and the retainer 949 applies clamp force to the drive straps 500. Washer 944 can surround the sleeve so sleeve can reciprocate through the washer 944 and the pressure plate 400 moves towards and away from the intermediate plate 300.

In FIG. 9F, no neck-down occurs to form a neck. Only a body 912 is formed after the head 914. In FIG. 9G, neck is surrounded by both spring sleeve retainers 946 & 948, while in FIG. 9E, the spring sleeve retainer 946 surrounds the body 912 and is recessed to adjoin the neck 913. In FIG. 9E, the retainer portion 949 applies clamp force to the drive straps 500. In FIG. 9G, the neck 913 has a circumference to apply clamp force to the drive straps 500, and the spring sleeve retainer can slide on neck 913. In FIG. 9H, a snap ring or washer 940 can be used to apply clamp force in addition to neck 913 against drive straps, or a washer can slide relative to neck and provide a seating surface for spring 920.

Comparing FIGS. 10A-10C, it is possible to reduce the number of spring separator assemblies applied to the intermediate and pressure plates and to select between 2 to 4 or more spring separator assemblies. The spring rate of the spring separator assemblies can be adjusted based on the number of spring separator assemblies. The number of drive straps and number of drive strap stacks can be tailored to the application, and so all of the spring separator assemblies can be used to secure drive straps or drive strap stacks, or less than the total number of spring separator assemblies can secure drive straps. So, there can be more spring separator assemblies than drive straps or drive strap stacks, or there can be more drive straps or drive strap stacks than spring separator assemblies.

FIGS. 11A-11D show another alternative spring separator assembly that can also secure the drive straps. This design replaces the drive strap rivet with an integrated fastener so that the drive straps can be clamped and the spring separator assembly can be on top of the drive strap location. The mounting comprises several components: a nose 1114, a neck 1113, a body 1112, a head 1115, and a washer 1140. The body can comprise a threaded portion. The spring separator assembly comprises the mounting, a cap 1130 with a keeper formed via an eccentric hole 1137, and a spring 1120 biased between the washer 1140 and the cap 1130. The cap 1130, which resembles a brimmed hat, comprises a brim 1135, a flue 1133, and a top 1131. Cap 1130 is biased against the pressure plate 400 so that a brim 1135 abuts the pressure plate 400. The pressure plate 400 can comprise a boss 410 designed to interface with the spring separator assembly.

The threaded portion on body 1112 goes through the drive straps 500 and then mates with a threading in strap-mounting hole 314 on the intermediate plate 300. Threaded strap-mounting hole 314 can be made in boss 312 and can be tapered to mate with a tapered end on threaded body 1112. The washer 1140 on the mounting provides a way to distribute the clamp forces from the thread and provides an abutment for one side of the separator spring 1120. The washer 1140 can be integral with the fastener as by being a necked-out portion, or skirt, of the mounting. Or washer can be a separate part assembled with the mounting. The head 1115 likewise can be a nut threaded to the body 112 or an integrally molded feature. In the separable variant, the nose 1114 and neck 1113 extend from the body 1112 and the nut forming the head 1115 and the washer 1140 are mounted to the body 1112.

The head 1115 is larger in diameter than the nose 1114 diameter but small enough for the separator spring 1120 to fit over it. The head 1115 can comprise a hex shape to permit an installer to clamp the drive straps 500 using a deep-well socket. Head 1115 can have shapes other than hex to interface with tools, such as square, triangle, etc. The diameter of the neck 1113 is smaller than the nose 1114 and the head 1115. The diameter and length of the neck 1113 permits movement of the separator spring 1120 in the cap 1130 to provide a balancing load with the drive straps 500 so the spring separator assembly moves to accommodate clutch engagement and disengagement.

The nose 1114 of the mounting extends from neck 1113 and can be bigger in diameter than the neck 1113. Nose 1114 can have a stepped-out portion of a larger diameter than the neck 1113 and can provide an abutment for the cap 1130. The top 1131 has an eccentric hole 1137 in it. One end of this hole 1137 is just larger than the nose 1114 and also has a slot that the neck 1113 can slide through. There is also enough length of the slot so that if the cap 1130 and mounting are in line (share the same center line) the cap 1130 is retained by the backside of the nose 1114. The nose 1114 can be tapered, as shown, to resemble a cone or can comprise another shape that permits a keyed fit between hole 1137 and mounting.

To install the cap 1130 after the drive straps have been attached to the intermediate plate 300, the separator spring 1120 must be compressed enough so the eccentric hole 1137 can pass over the nose 1114. Then the cap is slid to be in line with the center-line of the mounting. Then, the spring 1120 is allowed to expand and the slot of the top 1131 and the compression of the spring 1120 center the spring separator assembly. The spring 1120 abuts the brim 1135 and surrounds the flue 1133. The nose 1114 seats with the flue 1133 and the nose 1113 and neck 113 abuts the top 1131 once assembled.

Figure 12A:
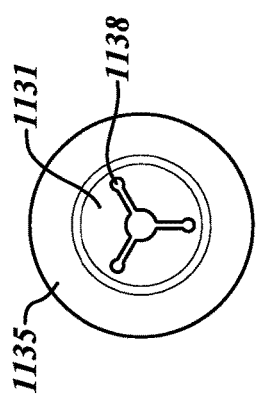
Figure 12B:
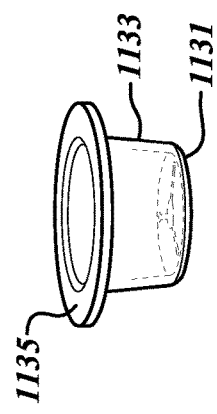

Alternative caps 1130 are shown in FIGS. 12A-13C. In FIGS. 12A & 12B, the brim and flue 1133 are as in FIGS. 11A-11D. The top 1131 comprises an alternative hole 1138.

The hole is fingered, forming a push-on fixture, similar to a TINNERMAN nut, a speed nut, or a push nut. Caps 1130 and 930 can comprise a steel or plastic composite. Alternative shapes can be included for fitting to the mountings. The fingers surrounding hole 1138 can deflect as the nose passes through, and then the fingers can catch against the stepped-out base 1117 of the nose portion, thereby surrounding the neck. Nose 1114 couples to the fingered hole 1138 by pushing through the fingered hole and catching between the neck 1113 and the nose 1114.

Figure 13A:
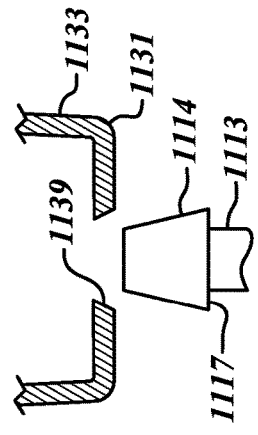
FIGS. 12A -13C are views of alternative caps for spring separator assemblies.
Figure 13B:
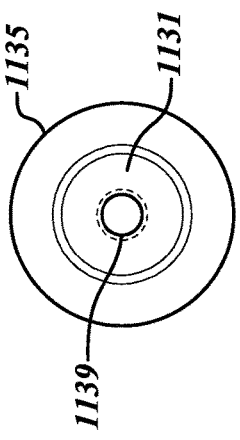
Figure 13C:
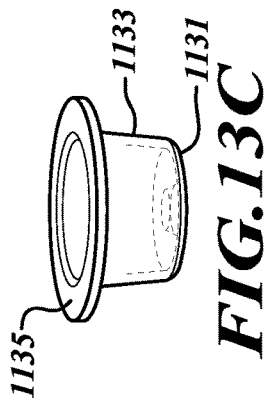

In FIGS. 13A-13C, the brim and flue 1133 are as in FIGS. 11A-11D. Top 1131 comprises a tapered hole 1139. Tapered nose 1114 can be pushed through the tapered hole 1139. A stepped-out base 1117 of the nose 1114 having a larger diameter than the neck 1113 catches against the top 1131 inside the flue portion 1133.

Other implementations will be apparent to those skilled in the art from consideration of the specification and practice of the examples disclosed herein. It is intended that the specification and examples be considered as exemplary only, with the true scope of the invention being indicated by the following claims.

What is claimed is:

1. A twin plate separation system for a clutch assembly, comprising:
    a pressure plate;
    an intermediate plate facing the pressure plate;
    a cover housing the pressure plate and the intermediate plate; and
    a spring separator assembly comprising:
        a mounting extending out of the pressure plate towards the intermediate plate; and
        a spring surrounding the mounting and biased to push the pressure plate and the intermediate plate apart,
    wherein the intermediate plate does not comprise a clearance hole for receiving the mounting, and
    wherein the cover does not comprise a clearance hole for receiving the mounting.

2. The system of claim 1, wherein the pressure plate comprises machined surfaces for locating the spring.

3. The system of claim 1, wherein the intermediate plate comprises machined surfaces for locating the spring.

4. The system of claim 1, further comprising a first friction disc between the pressure plate and the intermediate plate.

5. The system of claim 4, further comprising a second friction disc adjacent the intermediate plate.

6. The system of claim 1, wherein the mounting is a spring pin.

7. The system of claim 1, wherein the spring is a coil spring comprising a length and a diameter that varies along the length, and wherein the diameter is smaller at a location adjacent the mounting for gripping the mounting.

8. The system of claim 1, wherein the mounting is a bolt comprising a head, the bolt extending head-first out of the pressure plate towards the intermediate plate.

9. The system of claim 8, further comprising a hat-like cap, the cap fitting to the head of the bolt, the cap comprising a brimmed portion in contact with the intermediate plate.

10. The system of claim 9, wherein the cap comprises a flue portion between the brimmed portion and a top portion, and wherein the spring surrounds the flue portion.

11. The system of claim 10, wherein the bolt head abuts the top portion.

12. The system of claim 8, wherein the bolt further comprises a neck portion between the head and the pressure plate, and wherein the bolt further comprises a neck-down portion embedded in the pressure plate.

13. The system of claim 1, further comprising:
    the cover comprising a first strap-mounting hole; and
    at least one drive strap spanning between the intermediate plate and the cover, the at least one drive strap fixed to the first strap-mounting hole and to the intermediate plate,
    wherein the intermediate plate comprises a second strap-mounting hole, and
    wherein the at least one drive strap is fixed to the second strap-mounting hole.

14. The system of claim 13, wherein the cover comprises a top, a boss, and a bottom, wherein the boss comprises the first strap-mounting hole configured to receive a drive strap fixture in a direction from the top of the cover towards the bottom of the cover.

15. The system of claim 14, wherein the drive strap fixture comprises a head and a body, and wherein the head extends upwards towards the top, and wherein the body extends downwards towards the bottom.

16. The system of claim 13, wherein the cover comprises a top, a boss, and a bottom, wherein the boss comprises the first strap-mounting hole configured to receive a drive strap fixture in a direction from the bottom towards the top.

17. The system of claim 16, wherein the drive strap fixture comprises a head and a body, and wherein the head extends downwards towards the bottom, and wherein the body extends upwards towards the top.

18. The system of claim 1, wherein the cover comprises a top, a boss, and a bottom, wherein the pressure plate is nearer the top than the bottom, and wherein the mounting does not extend out of the pressure plate towards the cover.

19. A twin plate separation system for a clutch assembly, comprising:
    a pressure plate;
    an intermediate plate facing the pressure plate;
    a cover housing the pressure plate and the intermediate plate, the cover comprising a top, a boss, a bottom, and a first strap-mounting hole;
    at least one drive strap fixed to the first strap-mounting hole and fixed to the intermediate plate;
    a spring separator assembly comprising:
        a mounting extending out of the pressure plate towards the intermediate plate; and
        a spring surrounding the mounting and biased to push the pressure plate and the intermediate plate apart,
    wherein the intermediate plate does not comprise a hole for receiving the mounting, and
    wherein the boss comprises the first strap-mounting hole configured to receive a drive strap fixture in a direction from the bottom towards the top.

20. A twin plate separation system for a clutch assembly, comprising:
    a pressure plate;
    an intermediate plate facing the pressure plate;
    a cover comprising a top, a boss, and a bottom, the cover housing the pressure plate and the intermediate plate; and
    a spring separator assembly comprising:
        a mounting extending out of the pressure plate towards the intermediate plate; and
        a spring surrounding the mounting and biased to push the pressure plate and the intermediate plate apart,
    wherein the intermediate plate does not comprise a hole for receiving the mounting, and wherein the mounting does not extend out of the pressure plate towards the cover.

* * * * *